(12) United States Patent
Alabes et al.

(10) Patent No.: US 11,294,799 B2
(45) Date of Patent: Apr. 5, 2022

(54) PLUGIN FOR MULTI-MODULE CODE COVERAGE IN WEB APPLICATIONS

(71) Applicant: Oracle International Corporation, Redwood Shores, CA (US)

(72) Inventors: Tomas Alabes, Foster City, CA (US); Nicolas Laplume, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 260 days.

(21) Appl. No.: 15/440,916

(22) Filed: Feb. 23, 2017

(65) Prior Publication Data

US 2018/0081791 A1 Mar. 22, 2018

Related U.S. Application Data

(60) Provisional application No. 62/395,385, filed on Sep. 16, 2016.

(51) Int. Cl.
*G06F 11/36* (2006.01)

(52) U.S. Cl.
CPC ...... *G06F 11/3676* (2013.01); *G06F 11/3688* (2013.01); *G06F 11/3692* (2013.01)

(58) Field of Classification Search
CPC .. G06F 11/3676; G06F 11/00; G06F 11/3688; G06F 11/3692; G06F 11/36–3696
USPC .......... 717/124–135; 714/38.1–38.14, 45, 46
See application file for complete search history.

(56) References Cited

U.S. PATENT DOCUMENTS

| | | | | |
|---|---|---|---|---|
| 7,137,103 | B2* | 11/2006 | Aizenbud-Reshef | ........................ G06F 11/3676 717/124 |
| 7,437,358 | B2* | 10/2008 | Arrouye | ............ G06F 16/24578 |
| 8,627,287 | B2* | 1/2014 | Fanning | .................... G06F 8/75 717/124 |
| 8,776,025 | B2* | 7/2014 | Wisniewski | ........ G06F 11/3664 717/124 |
| 9,021,446 | B2* | 4/2015 | Prakash | .............. G06F 11/3676 717/130 |

(Continued)

OTHER PUBLICATIONS

Oosterwaal, S., Combining Source Code and Test Coverage Changes in Pull Requests, Delft University of Technology [online], 2015 [rerieved Apr. 5, 2020], Retrieved from Internet: <https://pdfs.semanticscholar.org/449d/eb701b317afcdea1eaff4a21b2a2fa05e4db.pdf>, whole document.*

*Primary Examiner* — Todd Aguilera
(74) *Attorney, Agent, or Firm* — Trellis IP Law Group, PC

(57) ABSTRACT

Implementations generally relate to test coverage of multi-module code. In some implementations, a method includes testing, at a server, program code from a plurality of software modules of a process. The method further includes determining individual test coverage information for each software module of the process based on the testing of the program code for each software module, where the individual test coverage information includes individual test results for each software module and an individual test coverage value for each software module. The method further includes aggregating the individual test coverage information of the software modules. The method further includes determining overall test coverage information for the software modules, where the overall test coverage information is based on the aggregating of the individual test coverage information for the software modules.

17 Claims, 8 Drawing Sheets

(56) References Cited

U.S. PATENT DOCUMENTS

| | | | |
|---|---|---|---|
| 9,280,442 B1* | 3/2016 | Nicolo | G06F 11/3604 |
| 9,824,075 B1* | 11/2017 | Gross | G06F 11/36 |
| 2002/0178281 A1* | 11/2002 | Aizenbud-Reshef | G06F 11/3676 |
| | | | 709/232 |
| 2005/0289109 A1* | 12/2005 | Arrouye | G06F 16/38 |
| 2008/0022262 A1* | 1/2008 | Prakash | G06F 11/3676 |
| | | | 717/124 |
| 2008/0250051 A1* | 10/2008 | Grechanik | G06F 11/368 |
| 2009/0144698 A1* | 6/2009 | Fanning | G06F 8/75 |
| | | | 717/120 |
| 2011/0276354 A1* | 11/2011 | Bijani | G06Q 10/00 |
| | | | 705/7.11 |
| 2013/0067298 A1* | 3/2013 | Li | G06F 11/3688 |
| | | | 714/799 |
| 2013/0117730 A1* | 5/2013 | Wisniewski | G06F 11/3664 |
| | | | 717/125 |
| 2015/0169431 A1* | 6/2015 | Ivankovic | G06F 11/3676 |
| | | | 717/124 |
| 2016/0196200 A1* | 7/2016 | Mizobuchi | G06F 11/3684 |
| | | | 717/124 |
| 2017/0083430 A1* | 3/2017 | Meerovich | G06F 11/3676 |
| 2017/0132116 A1* | 5/2017 | Lopian | G06F 11/3684 |

\* cited by examiner

PLUGIN FOR MULTI-MODULE CODE COVERAGE IN WEB APPLICATIONS

CROSS REFERENCES TO RELATED APPLICATIONS

This application claims priority from U.S. Provisional Patent Application Ser. No. 62/395,385, entitled PLUGIN FOR MULTI-MODULE CODE COVERAGE IN WEB APPLICATIONS, filed on Sep. 16, 2016 (Trellis ref ORACP0166P/Client ref. ORA170295-US-PSP), and U.S. Provisional Patent Application Ser. No. 62/395,341, entitled SYSTEM FOR PROCESS CLOUD SERVICE, filed on Sep. 15, 2016 (Trellis ref ORACP0192P/Client ref. ORA170390-US-PSP), which are hereby incorporated by reference as if set forth in full in this application for all purposes.

BACKGROUND

Efficient, adaptable, and insightful management systems and methods can be particularly important in enterprise applications, where accurate management and informed decision making can enhance enterprise profits. Some management systems improve corporate performance by managing and optimizing a company's processes. Such systems enable organizations to be more efficient and effective. Software modules are typically combined into one software program to provide a management system, and such software modules are typically tested for proper operation.

SUMMARY

Implementations described herein enhance test coverage of multi-module code. In some implementations, an apparatus includes one or more processors, and includes logic encoded in one or more non-transitory computer-readable storage media for execution by the one or more processors. When executed, the logic is operable to perform operations including testing, at a server, program code from a plurality of software modules of a process; determining individual test coverage information for each software module of the process based on the testing of the program code for each software module, where the individual test coverage information includes individual test results for each software module and an individual test coverage value for each software module; aggregating the individual test coverage information of the software modules; and determining overall test coverage information for the software modules, where the overall test coverage information is based on the aggregating of the individual test coverage information for the software modules.

A further understanding of the nature and the advantages of particular embodiments disclosed herein may be realized by reference of the remaining portions of the specification and the attached drawings.

DETAILED DESCRIPTION OF EMBODIMENTS

Figure 1:
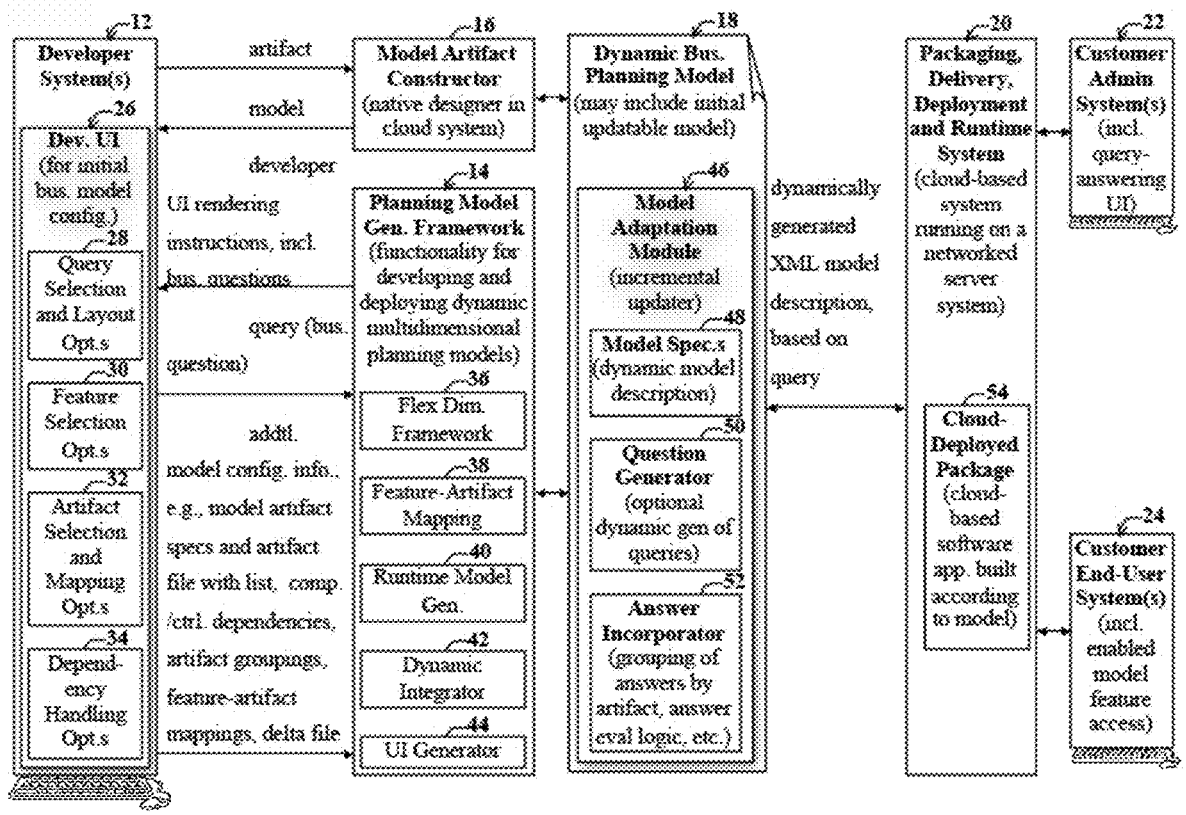
FIG. 1 illustrates an example block diagram of a system, which may be used for implementations described herein.

Implementations described herein enhance test coverage of multi-module code. Implementations provide a plugin that creates a general or overall coverage report compiled from individual coverage reports of individual software modules. Implementations set up the test coverage by instrumenting code (e.g., using Istanbul) and determining coverage events in order to save the data into a file. Implementations compile the coverage file into a single coverage report, allowing the merging of several different files coming from different software modules. Implementations report the results, and indicate an error if the coverage is not sufficient.

In some implementations, a method includes testing, at a server, program code from a plurality of software modules of a process. The method further includes determining individual test coverage information for each software module of the process based on the testing of the program code for each software module, where the individual test coverage information includes individual test results for each software module and an individual test coverage value for each software module. The method further includes aggregating the individual test coverage information of the software modules. The method further includes determining overall test coverage information for the combined software modules, where the overall test coverage information is based on the aggregating of the individual test coverage information for the software modules.

In various implementations, an enterprise may be any organization of persons, such as a business, university, government, military, and so on. The terms "organization" and "enterprise" are employed interchangeably herein. A talent management system or application may be any software application or functionality for facilitating selecting, organizing, or managing enterprise personnel or tasks performed thereby. Personnel of an organization may include any persons associated with the organization, such as employees, contractors, board members, and so on.

Software functionality may be any function, capability, or feature, e.g., stored or arranged data, that is provided via computer code, e.g., software. Generally, software functionality may be accessible via use of a user interface (UI), and accompanying user interface controls and features. Software functionality may include actions, such as retrieving data pertaining to a business object; performing an enterprise-related task, such as promoting, hiring, and firing enterprise personnel, placing orders, calculating analytics, launching certain dialog boxes, performing searches, and so on.

In various implementations, a UI control may be any displayed element or component of a UI display screen, which is adapted to enable a user to provide input, view data, and/or otherwise interact with a UI. Additional examples of UI controls include buttons, drop down menus, menu items, tap-and-hold functionality, and so on. Similarly, a UI control signal may be any signal that is provided as input for software, where the input affects a UI display screen and/or accompanying software application associated with the software.

A UI display screen may be any software-generated depiction presented on a display. Examples of depictions include windows, dialog boxes, displayed tables, and any other graphical UI features, such as UI controls, presented to a user via software, such as a browser. A UI display screen contained within a single border is called a view or window. Views or windows may include sections, such as sub-views or sub-windows, dialog boxes, graphs, tables, and so on. In certain cases, a UI display screen may refer to all application windows presently displayed on a display. The terms UI display screen and screen may be employed interchangeably herein.

A UI display screen generated by a networked software application and accessible via a browser is called an application page (or simply page) herein. A UI component may be an application page or collection of related or linked pages.

An enterprise computing environment may be any collection of computing resources of an organization used to perform one or more tasks involving computer processing. An example enterprise computing environment includes various computing resources distributed across a network, and may further include private and shared content on intranet web servers, databases, files on local hard discs or file servers, email systems, document management systems, portals, and so on.

Enterprise software may be any set of computer code that is adapted to facilitate implementing any enterprise-related process or operation, such as managing enterprise resources, managing customer relations, and so on. Example resources include human resources (HR) (e.g., enterprise personnel), financial resources, assets, employees, business contacts, sales data, and so on, of an enterprise. Examples of enterprise software include enterprise resource planning (ERP) software for facilitating managing enterprise activities (e.g., product planning, inventory management, marketing, sales, and so on). Example ERP applications include customer relationship management (CRM), human capital management (HCM), business intelligence (BI), enterprise asset management, enterprise asset management, corporate performance and governance applications, and so on.

The terms "enterprise software" and "enterprise application" may be employed interchangeably herein. However, an enterprise application may include one or more enterprise software modules or components, such as UI software modules or components.

Note that conventionally, while certain financial tools, tables, and so on (e.g., balance sheets, cash flow statements, etc.), are standardized, different companies may prefer to maintain and view operational and financial planning data and tasks differently, e.g., in accordance with different business and computing environment requirements. This can be particularly true at granular levels, i.e., where detailed enterprise data must be observed and analyzed in accordance with business planning objectives.

For example, a particular service company may experience substantial compensation expenses (e.g., payments to employees, contractors, etc.), which may represent the primary driver for expense planning. Similarly, a small consulting company may experience substantial travel expenses, which may represent a primary driver for expense planning. Accordingly, two different service companies may base their expense planning on substantially different drivers.

Similarly, different companies may employ different methods of accounting, e.g., a direct method or indirect method of accounting. Accordingly, different companies may rely upon different drivers for handling accounting details.

Furthermore, the granularity of planning (i.e., the level of detail demanded or required) may vary across different companies and/or business types, segments, or other domains. For example, a fast moving consumer goods company may plan revenue by product, market, channel, and segment, whereas an information technology (IT) company may plan revenue by service, market, and customers. Accordingly, different companies may rely upon different drivers for various types of planning.

In addition, while certain companies may prefer to perform business planning using a collection of standard or common drivers and associated software modules and functionality (e.g., standard labor, material, etc.), other companies may prefer to perform direct entry for project expenses, revenue, etc.

Accordingly, different businesses may have different planning requirements or needs, which can be difficult to meet using conventional static business planning modules and associated software applications. Certain implementations discussed more fully below provide systems and accompanying mechanisms and methods for enabling dynamic adaptation of an existing initial business planning model (which may be called a seed model herein), thereby enabling the initial seed planning model to uniquely grow to meet individual or specific needs of a given business or organization.

For clarity, certain well-known components, such as hard drives, processors, operating systems, power supplies, routers, Internet service providers (ISPs), identity management systems, workflow orchestrators, process schedulers, integration brokers, tenant automation systems (TASs), online analytical processing (OLAP) engines, certain web services, virtual machines, middleware, enterprise databases, and so on, are not necessarily explicitly called out in the figures. However, those skilled in the art with access to the present teachings will know which components to implement and how to implement them to meet the needs of a given implementation.

FIG. 1 illustrates an example block diagram of a system 100, which may be used for implementations described herein. In various implementations, system 100 is an enterprise-computing environment configured to enable initial development of a dynamic business planning model 18. In various implementations, system 100 incrementally updates business planning model 18 to meet specific enterprise needs, and uses resulting updated business planning model 18 as part of a cloud-based enterprise software application or service 54 (labeled "Cloud-Deployed Package"). While system 100 performs implementations described herein, in other implementations, any suitable component or combination of components associated with system 100 or any suitable module or module s associated with system 100 may facilitate performing the implementations described herein. In various implementations, system 100 may not have all of the components shown and/or may have other elements including other types of modules instead of, or in addition to, those shown herein.

System 100 includes a developer computer system 12 (labeled "Developer System(s)") that is in communication with a planning model generation framework 14 and a model artifact constructor 16. Computer system 12 may also be referred to herein as the developer system or the developer computer. Model artifact constructor 16 may leverage preexisting functionality, e.g., as may be available via a native designer in a cloud computing system implemented as part of system 100.

Planning model generation framework 14 and model artifact constructor 16 that are leveraged to develop business planning model 18, may further communicate with a packing, delivery, deployment and runtime system and/or computing framework 20 (labeled "Packaging, Delivery, Deployment and Runtime System"). Modules 14-20 may be hosted in a cloud, i.e., a server system accessible via a network, such as the Internet.

A cloud-deployed package 54, i.e., software application, embodying business planning model 18 is may be hosted in the cloud, i.e., cloud-based. For the purposes of the present discussion, cloud-based software may be any software run on one or more servers and accessible to client systems via a network used to communicate with the software.

In some implementations, cloud-deployed package 54 may represent a software application that may provide one or more web services for use by other software applications, and/or may provide cloud-services, e.g., on a subscription basis, to one or more client systems, e.g., a customer administrator system 22 (labeled Customer Admin System (s), and a customer end-user system 24 (labeled Customer End-User System(s). For the purposes of the present discussion, the term "customer" refers to any user, such as an administrator and/or end user, e.g., who may be part of an organization that has access to cloud-deployed package 54.

In some implementations, a developer system 12 accesses model artifact constructor 16 and planning model generation framework 14 via a network, such as the Internet. Developer system 12 may include a browser used to browse to the network address that provides access to functionality provided by model artifact constructor 16 and planning model generation framework 14.

After browsing to a network address allotted for system developers, designers, and/or other qualified personnel, various dynamic model-building functionality is accessible to the developer system, e.g., via various developer UI display screens 26 (labeled "Dev. UI").

Software functionality may be any function, capability, or feature, e.g., stored or arranged data, that is provided via computer code, e.g., software. Generally, software functionality may be accessible via use of a UI, and accompanying user interface controls and features. Software functionality may include actions, such as retrieving data pertaining to a business object; performing an enterprise-related task, such as promoting, hiring, and firing enterprise personnel, placing orders, calculating analytics, launching certain dialog boxes, performing searches, and so on.

Software functionality, or a set of software functionalities, that is/are associated with or used by a business planning model, is called a model feature (or simply feature) herein. Examples of features include, but are not limited to, software functionality for implementing indirect cash flow statements, income statements, and so on.

For the purposes of the present discussion, a UI control may be any displayed element or component of a UI display screen, which is adapted to enable a user to provide input, view data, and/or otherwise interact with a UI. Additional examples of UI controls include buttons, drop down menus, menu items, tap-and-hold functionality, and so on. Similarly, a UI control signal may be any signal that is provided as input for software, where the input affects a UI display screen and/or accompanying software application associated with the software. The terms UI control and UI component (or simply component) may be employed interchangeably herein.

A descriptor or characteristic of a business planning model and/or associated UI display screens and/or UI layout, is called a model artifact (or simply artifact) herein. Examples of model artifacts include, but are not limited to metadata (e.g., metadata describing a UI layout or UI model framework), dashboards, business rules, forms, dimensions, and so on.

Artifacts may represent or be associated with categories of features or software functionality. When functionality is associated with a business model artifact, the artifact may be seeded with one or more functionalities or features.

Artifacts and features may be dependent or independent. A dependent artifact or feature is one that relies upon the existence or operation of another artifact or feature for proper functioning. Similarly, an independent artifact or feature may be added to a model without requiring special handling of interdependencies, as discussed more fully below. Examples of potential dependent artifacts include, but are not limited to composite forms, rule sets, and so on.

A valid artifact may be any artifact that may be associated with (e.g., seeded with) one or more features that are available for a business planning model. The availability of a feature to an artifact may be defined in initial business planning model 18, e.g., by a developer using business planning model designer software represented by planning model generation framework 14 and model artifact constructor 16 of FIG. 1.

In some implementations, developer UI display screens 26 include a query-selection UI display screen (and/or set of UI controls) 28, a feature-selection UI display screen 30, an artifact-selection UI display screen 32 (labeled "Artifact Selection and Mapping Opts," and an artifact and feature dependency handling UI display screen 34.

Planning model generation framework 14 includes a flex-dimension framework 36, a feature-artifact mapping module 38, a runtime model generator 40, a dynamic functionality integrator 42, and a UI generator 44.

Generated, dynamic, business planning model 18, which may be defined by and/or specified via an extensible markup language (XML) document, includes a specification 48 (labeled "Model Specs") of business planning model 18, and optionally, embedded question generator code (or a link to code) 50 and answer incorporator 52, e.g., for facilitating incorporating answers to business questions, as may be provided via the customer administrator system 22 (labeled "System(s)," as discussed more fully below.

Packaging, delivery, deployment, and runtime system 20 hosts and runs deployed cloud-based software package or application 54, also referred to as "cloud-deployed package" 54. Functionality of deployed application 54, also referred to as "cloud-deployed package 54," is accessible to customer end-user client system 24.

Note that in general, groupings of various modules of system 100 are illustrative and may vary, e.g., certain modules may be combined with other modules or implemented inside of other modules, or the modules may otherwise be distributed differently (than shown) among a network or within one or more computing devices or virtual machines, without departing from the scope of the present teachings. For example, a question generator 50 and answer incorporator 52 shown as part of dynamic business planning model 18 may instead, or in addition, be incorporated into planning model generation framework 14.

Furthermore, certain modules of planning model generation framework 14 may be implemented client-side, e.g., on developer system 12. In general, certain server-side, i.e., cloud-based modules (e.g., running on a server or server system) may be implemented client-side (e.g., running on a client computer communicating with a server), and vice versa, in a manner different than shown in FIG. 1.

In an example scenario, a business model developer (also called designer herein) employs developer system 12, e.g., artifact-selection screen 32, to specify, access, and/or configure model artifacts, leveraging model artifact constructor 16. Artifact-selection screen 32 presents one or more UI controls (which may provide so-called user options, or simply options) for facilitating developer construction, selection, and configuration of model artifacts, as well as UI controls enabling configuration and/or specification of mappings and/or rules associated with the artifacts. The mappings discussed herein refer to associations between business model artifacts and features, and are also called feature-artifact and/or artifact-feature mappings.

After developing and/or configuring a set of one or more business model artifacts, e.g., by leveraging artifact-selection screen(s) 32 and associated model artifact constructor 16, the resulting artifacts may be stored locally or via the server system that hosts modules 14-20.

Next, in the present example scenario, the developer employs feature-selection screen 30 to select and/or configure a set of business model features. Feature construction and/or selection may also be facilitated via model artifact constructor 16 and/or code run as part of planning model generation framework 14, e.g., via code run on feature-artifact mapping module 38.

After initial selection and/or configuration of a set of one or more model artifacts and one or more model features, the developer may employ one or more UI controls of artifact-selection screen 32 to configure and/or specify initial mappings and/or associated mapping rules that define associations between the configured artifacts and features.

Artifact-selection and mapping screen 32 may include UI controls that leverage the functionality of feature-artifact mapping module 38 of planning model generation framework 14. Feature-artifact mapping module 38 may include additional code for implementing automatic feature-artifact mappings in accordance with groupings of business questions and/or answers to the business questions, e.g., so as to automatically update dynamic business planning model 18, as discussed more fully below.

UI generator 44 of planning model generation framework 14 includes code for generating rendering instructions to render developer-side UI display screens 26, and further includes code for generating rendering instructions for UI display screens of cloud-deployed package 54, which are exposed to customer end-user system 24.

Developer-side query-selection and layout options screen 28 includes UI controls and access to associated functionality for defining, selecting, and/or grouping business questions (called queries) to be exposed in a UI display screen accessible to customer administrator system 22. The UI display screens are displayed as part of the dynamic business planning model 18 and are exposed to the customer administrator system 22, and include a UI display screen that lists business questions that have been enabled for existing dynamic business planning model 18.

The initial business questions selected by a developer using query-selection and layout options screen 28 may be listed and/or otherwise formatted in accordance with developer-selected layout options provided via query-selection and layout options screen 28. UI controls of query-selection and layout options screen 28 provide developer-access to associated functionality (e.g., functionality which may be provided via UI generator 44 and feature-artifact mapping module 38 and/or other modules of planning model generation framework 14) for defining, selecting, and/or otherwise configuring business questions and how the questions will be laid out in a UI display screen exposed to a customer administrator, e.g., via customer administrator system 22.

Mappings of artifacts are grouped by business question or by business question group or type. Mappings of artifacts to features may depend, in part, on the business questions established via use of query-selection and layout options screen 28.

The developer may further specify dependency-handling options via one or more UI controls provided in dependency-handling options screen 34. The dependencies may include dependencies between business questions (e.g., in cases where the answer to one business question may affect other questions or answers, and dependencies between different artifacts (and/or groups or types of artifacts), and dependencies between different features (and/or groups or types of features). Such dependencies may require that a change (e.g., difference) in one question, artifact, and/or feature, be propagated to another question, artifact, and/or feature.

Various implementations discussed herein may employ difference or delta processing to ensure that dependencies are handled without introducing conflicts. This involves referencing the established associations and associated selected configuration options (e.g., as may be specified by a developer via dependency-handling options screen 34) and making adjustments to the business model based thereon and in response to a detected change in an artifact, feature, question, etc.

Accordingly, developer system 12 forwards business question selections and associated identifications, descriptions, and/or configuration information (e.g., as may be provided responsive to developer manipulation of query-selection and layout options screen 28) to business planning model generation framework 14. In addition, various additional UI controls included among developer UI display screens 26 may enable specification and forwarding of additional information to planning model generation framework 14, including, but not limited to additional business model configuration information, e.g., model artifact specifications, an artifact file listing artifacts for an initial business planning model, component (e.g., UI control) dependencies (between UI controls to be rendered and exposed via cloud-deployed package 54), artifact grouping information, feature-artifact mapping data, delta file specifications (e.g., describing dependencies between various questions, artifacts, and/or features), feature specifications, flex dimension configuration parameters and/or specifications, and so on.

Business planning model generation framework 14 then processes the inputs received via developer system 12 to automatically construct an initial business planning model, also called the seed model. Some example modules usable to construct initial dynamic business planning model 18 and to implement incremental updates thereto, include, but are not limited to flex dimension framework 36, feature-artifact mapping module 38, runtime model generator 40, dynamic integrator 42, and UI generator 44.

Flex dimension framework 36 includes computer code for enabling customer administrators (e.g., using customer administrator system 22) and/or customer end users (e.g., using customer end-user system 14) to add flex dimensions to various UI display screens exposed via cloud-deployed package 54. Flex dimension framework 36 then enables extension of business planning model 18 in accordance with the added flex dimensions. Note that whether initial business planning model 18 supports flex dimensions, which flex dimensions, if any, are supported, and behaviors of the flex dimensions, may be specified by a developer via one or more UI controls provided in developer UI display screens 26.

Feature-artifact mapping module 38 includes computer code for enabling automatic implementation of changes introduced to dynamic business planning model 18 in response to answers provided in response to business questions posed to an administrator (or other authorized user) of customer administrator system 22. In particular, when an administrator provides a new answer to a question (e.g., which may be posed via a UI prompt, such as a check box), any artifacts associated with the question are then automatically populated with features via feature-artifact mapping module 38. The resulting populated artifacts are then incorporated into updated dynamic business planning model 18 after any artifact and/or feature dependencies are handled and/or deltas are processed.

Runtime model generator 40 includes computer code for automatically generating a new or updated dynamic business planning model 18 for incorporation into cloud-deployed package 54. The updates to running cloud-deployed package 54 by runtime model generator 40 may be implemented via patching and/or other known technologies for adjusting running software applications.

Dynamic integrator 42, which may communicate with other modules of planning model generation framework 14, facilitates implementing delta differencing processing to accommodate newly added functionality without introducing conflicts in updated business planning model 18. Integrator 42 may further include computer code for facilitating and/or ensuring efficient interoperability between different intercommunicating business planning models and associated software applications deployed via packaging, delivery, deployment, and runtime system 20.

Note that information exchange between developer system 12 and between various cloud-based modules 14-20 may be implemented via exchange of XML files that are also transferred between the system and modules. Furthermore, dynamic business planning model 18 may be implemented substantially via an XML document defining the model.

In some implementations, dynamic business planning model 18 includes a model adaptation module 46, which includes computer code for facilitating some self-adaptation of dynamic business planning model 18. Note that in other implementations, model adaptation module 46 may be included instead in planning model generation framework 14.

In some implementations, model adaptation module 46 includes, in addition to a description of the business planning model (including a description of existing questions, artifacts, and associated features), a specification of code for dynamic question generator 50 and answer incorporator 52.

Dynamic question generator 50 may include computer code (and/or links thereto) for automatically adjusting a list of business questions exposed via a UI of customer administrator system 22, e.g., in response to one or more answers provided thereby by an administrator using customer administrator system 22. This may be particularly useful for reconfiguring listing of displayed questions in response to an answer to a question that affects the validity of other questions displayed in (or to be displayed among) the listing of business questions.

Answer incorporator 52 may include computer code (and/or links thereto) for adjusting groupings of artifacts by answers and/or answer type or category. Answers to the business questions may be evaluated by evaluation logic to determine how a new listing of questions should be generated and laid out (in the UI exposed to the customer administrator system 22).

Note that various modules 36-44 of the business planning model generation framework 14 may intercommunicate, e.g., via interfacing functionality incorporated therein. Similarly modules 48-52 of model adaptation module 46 of dynamic business planning model 18 may intercommunicate.

Once initial business planning model 18 is developed and/or configured via developer system 12, it can be deployed as cloud-deployed package 54, which is then made available to customer administrator system 22 and customer end-user system 24. The customer administrator may then use customer administrator system 22 to answer business questions. The resulting answers then feed back to framework modules 14-20, which then adapt or update dynamic business planning model 18 in accordance with the answers. The adjustment to dynamic business planning model 18 is effectuated through use of artifacts, which are then mapped or seeded with features corresponding to the answered questions, and in accordance with the answers to the answered questions, as discussed more fully below.

Accordingly, the present example implementation may enable customers to substantially forgo, configuring and/or updating business planning software. Several business planning processes (which may be associated with different business planning models and/or sub-models) may be selectively and incrementally rolled out to customer end users (e.g., users of customer end-user system(s) 24). Furthermore, integration between added features (e.g., sets of software functionality associated with different business processes) is automatically accommodated, e.g., via dynamic integrator 42 and feature-artifact mapping module 38 of business planning model generation framework 14.

Furthermore, by enabling customer addition of and configuration of flex dimensions to dynamic business planning model 18, the resulting automatically handled dimensions can significantly reduce implementation time for customers to implement new features and associated business model artifacts.

Customers now have significant flexibility and options for configuring various planning business processes. Customers can leverage these configuration capabilities, reduce implementation time, and continue building the model over time, as necessary to meet the needs of the customer organization.

Furthermore, business planning models developed and deployed using system 100 may now readily evolve and adapt to meet different and/or changing business needs while remaining consistent with industry-standard best practices. Furthermore, as best practices change, dynamic business planning model 18 may adapt to comply with the new best practices.

Figure 2:
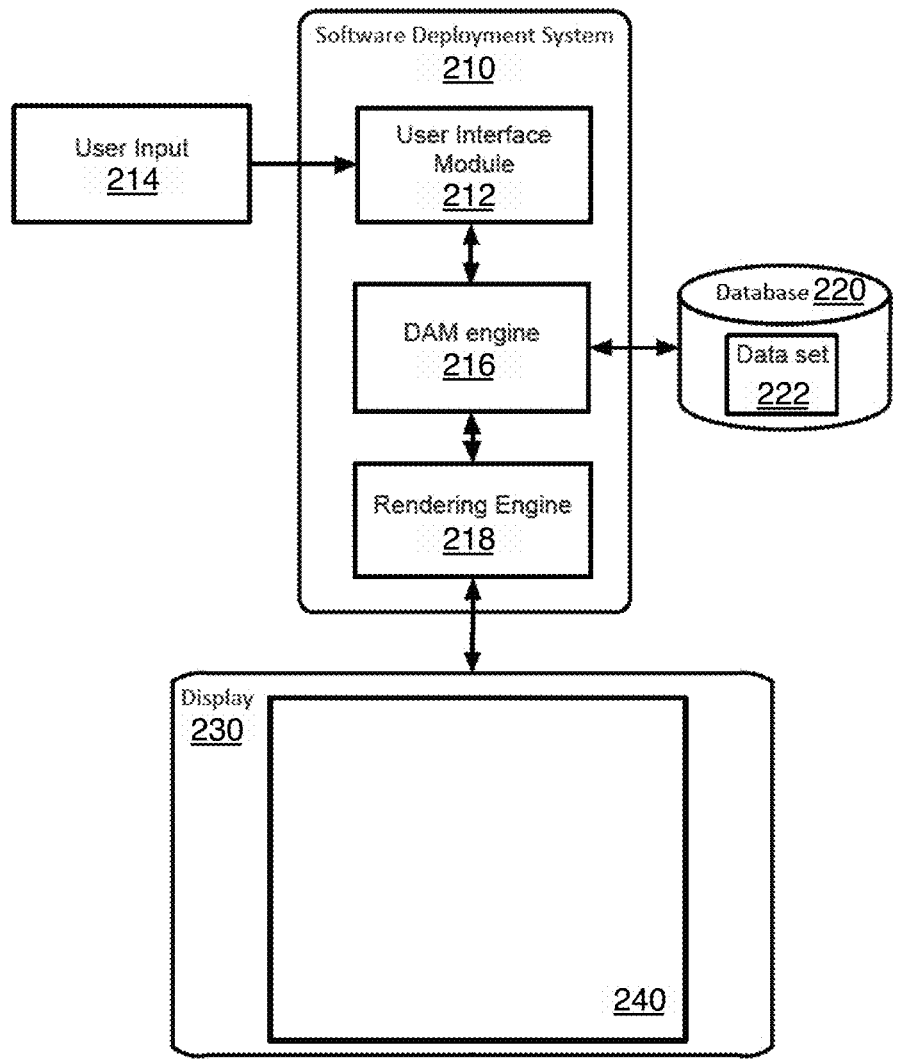
FIG. 2 illustrates an example block diagram of a computing system, which may be used for implementations described herein.

FIG. 2 illustrates an example block diagram of a computing system 200, which may be used for implementations described herein. Computing system 200 provides an interface layer, such as an application program interface (API). The interface layer provides users with seamless connectivity between different instantiations of an application located in different environments (e.g., development environment, production environment, etc.). Computing system 200 may be any computing system, such as an enterprise computing environment, client-server system, and the like.

Computing system 200 also includes software management system 210, also referred to herein as software deployment system 210. Software management system 210 may include a user interface module 212. User interface module 212 may be configured to receive and process data signals and information received from a user interface 214, also referred to herein as user input 214. For example, user interface module 212 may be adapted to receive and process data from user input associated with data for processing via software management system 210. Software management system 210 is configured to process data received from user interface 214, such as a keyboard, mouse, etc. for receiving user input.

Software management system 210 may also include a process engine 216, also referred to herein as digital asset management (DAM) engine 216, and a rendering engine 218. Process engine 216 may be configured as an API or any interface or data structure that may be used to advantage.

In some implementations, computing system 200 may include a data source such as database 220. Database 220 may be connected to the software management system 210 directly or indirectly, for example via a network connection, and may be implemented as a non-transitory data structure stored on a local memory device, such as a hard drive, solid state drive (SSD), flash memory, and the like, or may be stored as a part of a cloud network, as further described herein.

Database 220 may contain one or more data sets 222. Data sets 222 may include data as described herein. Data sets 222 may also include data pertaining to data attributes, data hierarchy, nodal positions, values, summations, types of charts of visualizations, algorithms, code (e.g., C++, JAVASCRIPT™, JSON, etc.), source, security, hashes, XML, and the like. In addition, data sets 222 may also contain other data, data elements, and information such as metadata, labels, development-time information, run-time information, configuration information, API, interface component information, library information, pointers, and the like.

In various implementations, software management system 210 is connected to a display 230 configured to display data 240 (e.g., graphical data, etc.), for example, to a user thereof. Display 230 may be a passive or an active display, adapted to allow a user to view and interact with display data 240 displayed thereon, via user interface 214. In other configurations, display 230 may be a touch screen display responsive to touches, gestures, swipes, and the like for use in interacting with and manipulating display data 240 by a user thereof. Gestures may include single gestures, multi-touch gestures, and other combinations of gestures and user inputs adapted to allow a user to convert, model, generate, deploy, and maintain display data 240.

In various implementations, process engine 216 may be adapted to receive data from user interface 214 and/or database 220 for processing thereof. In one configuration, process engine 216 is a software engine configured to receive and process input data from a user thereof pertaining to display data 240 from user interface 214 and/or database 220 in order to provide the process API layer.

Process engine 216 in other implementations may be configured as a data analysis tool to perform analysis functions associated with display data 240. Such analysis functions may include determining attributes associated with the data, partitions, local and remote pods (layers), communication protocols, determining the relationships to other data, interpreting metadata associated with the data, and the like. For example, process engine 216 may be configured to receive and analyze data sets 222 to determine user interface configuration, data processing instructions, data attributes, data hierarchy, nodes, nodal positions within the hierarchy, values, summations, algorithms, source, security, hashes, and the like, associated with data sets 222.

Process engine 216 may receive existing data sets 222 from database 220 for processing thereof. Such data sets 222 may include and represent a composite of separate data sets 222 and data elements pertaining to, for example, organizational data, which may include employment data, salary data, personnel data, and the like. In addition, data sets 222 may include other types of data, data elements, and information such as contact data, sales data, production data, scientific data, financial data, medical data, census data, and the like.

Rendering engine 218 may be configured to receive configuration data pertaining to display data 240, associated data sets 222, and other data associated with display data 240 such as user interface components, icons, user pointing device signals, and the like, used to render display data 240 on display 230. In one exemplary implementation, rendering engine 218 may be configured to render two-dimensional (2D) and three-dimensional (3D) graphical models and simulations to allow a user to obtain more information about data sets 222. In one implementation, upon receiving instruction from a user, for example, through user interface 214, rendering engine 218 may be configured to generate a real-time display of interactive changes being made to display data 240 by a user thereof.

Note that the computing system 200 presents a particular example implementation, where computer code for implementing embodiments may be implemented, at least in part, on a server. However, embodiments are not limited thereto. For example, a client-side software application may implement software management system 210, or portions thereof, in accordance with the present teachings without requiring communications between the client-side software application and a server.

Figure 3:
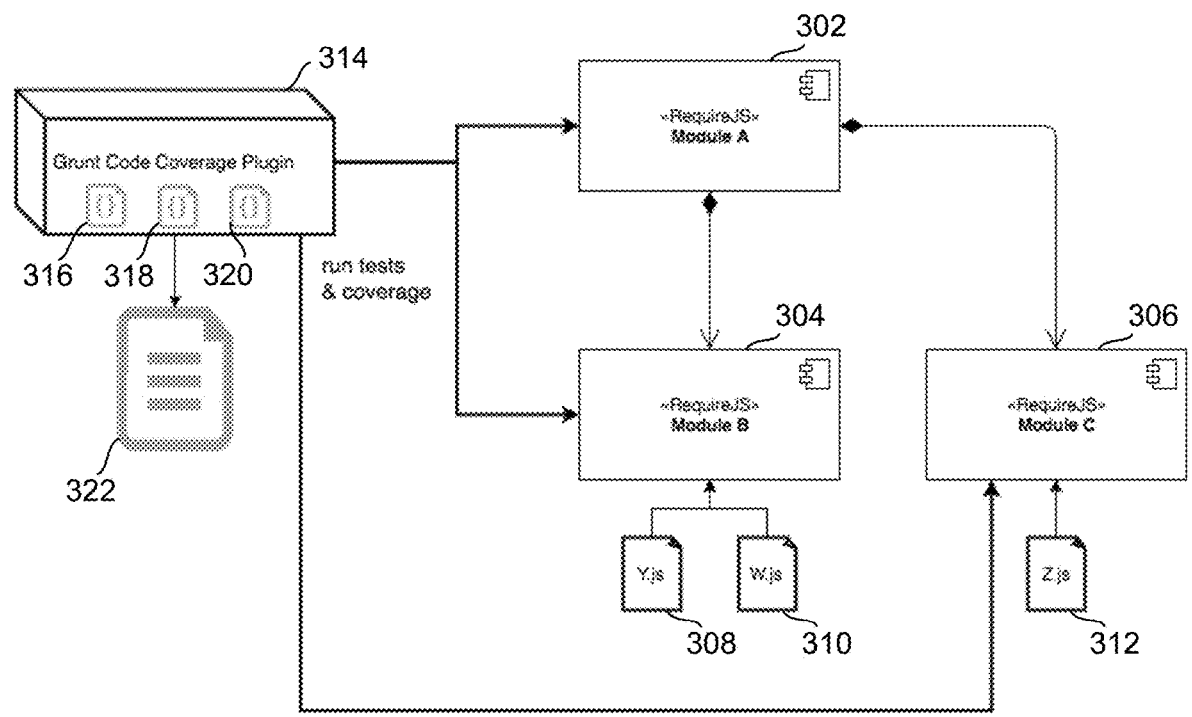
FIG. 3 illustrates an example block diagram of a multi-module environment, according to some implementations.

FIG. 3 illustrates an example multi-module environment 300, according to some implementations. Shown are module 302 (also labeled Module A), module 304 (also labeled Module B), and module 306 (also labeled Module C). In various implementations, modules 302, 304, and 306 are part of a software program for a process such as a business process. As described in more detail herein, the software program may provide a business planning model such as dynamic business planning model 18 of FIG. 1 and/or any business process management software system that manages business processes.

In various implementations, modules 302, 304, and 306 are independently developed modules that are combined into one software program for a process. Modules 302, 304, and 306 may be developed independently by different developers located in one or more geographic locations (e.g., around the world). As described in more detail herein, each module contains program code having program instructions. In various implementations, the modules may be also referred to as software modules. Implementations described herein may be implemented using developer system 12 in combination with planning model generation framework 14 and dynamic business planning model 18 of FIG. 1, and/or software deployment system 210 of FIG. 2.

As indicated herein, modules 302, 304, and 306 may be developed independently by different developers. Also, each module may be developed by a team of developers in an organization. Each team in an organization may develop one or more different modules. For ease of illustration, three modules are shown in FIG. 3. However, there may be any number of modules, depending on the particular implementation. As such, in various implementations, environment 300 may not have all of the modules and components shown and/or may have other elements including other types of modules and components instead of, or in addition to, those shown herein. For example, environment 300 may have over 50 modules, etc.

In some implementations, each module may include JAVASCRIPT™ (JS) files. In various implementations, a JS file includes program code with program instructions, and the JS file may be used to run client-side JAVASCRIPT™ code on a webpage. JS files may include various resources including code, data, libraries, etc. In some implementations, other files such as non-JAVASCRIPT™ files and module loaders may be used instead of JAVASCRIPT™ files.

As shown, module 304 includes a JS file 308 (labeled Y.js) and a JS file 310 (labeled W.js). Module 306 includes one JS file 312 (labeled Z.js). For ease of illustration, two modules are shown to be associated with module 304, and one module is shown to be associated with module 306. There may be any number of JS files associated with a give module, depending on the particular implementation. As such, in various implementations, environment 300 may not have all of the JS files shown and/or may have other JS files instead of, or in addition to, those shown herein. For example, module 306 may have more than one JS file, module 302 may have one or more JS files, etc.

JS files 308 and 310 may be associated with a particular handler. For example, JS file 308 may be associated with a process communication handler, and JS file 310 may be associated with a deployment handler. These handlers may be used to exchange messages among each other and/or with a web server. Such messages may contain process information such as commands and events.

In various implementations, the programming code of each module 302, 304, and 306 is tested to ensure that the code is free of software bugs (e.g., errors or other defects).

In various situations, software errors may be related to software dependencies. For example, in the example implementation of FIG. 3, each module 302, 304, and 306 may have one or more dependencies. In various implementations, a dependency may be a resource that is referred to by one or more program instructions in the program code of a module. Such resources, or dependencies, may include classes, data, archives, libraries, APIs, web services, and other resources.

In various implementations, the dependencies may include internal dependencies, where an internal dependency and program instructions referring to the internal dependency are located in the same software module. Dependencies may also include external dependencies, where an external dependency and program instructions referring to the external dependency are located in different software modules. RequireJS helps to manage JS files, including their internal dependencies and external dependencies. These dependencies are described in more detail herein.

As indicated herein, the programming code of each module 302, 304, and 306 is tested to ensure that the code is free of software bugs. As described in more detail herein, in various implementations, a plugin 314 of the system executes tests on individual modules in order to obtain individual test coverage information for each of respective modules 302, 304, and 306. In some implementations, plugin 314 may be a grunt code coverage plugin, or any other suitable type of plugin.

In various implementations, the system stores the individual test coverage information for each module in respective individual test coverage files 316, 318, and 320. In other words, there is one individual test coverage file per module. In various implementations, the individual test coverage information in each individual test coverage file 316, 318, and 320 may include what specific sections of code were tested (e.g., JS files 308, 310, 312, etc.). The individual test coverage information may also include the test results for each section of code that was tested (or for each JS file that was tested).

As described in more detail herein, in various implementations, the individual test coverage information includes a test coverage value for each module. In some implementations, the test coverage value is a percentage. For example, if JS file 308 of module 304 was tested and JS file 310 of module 304 was not tested, the system would store the test results for module 304 in a corresponding individual test coverage file. The individual test coverage file indicates the test results for the code in JS file 308, and would indicate that the test coverage for module 304 was 50%. In other words, one of two JS files were tested.

As described in more detail herein, in various implementations, plugin 314 compiles the individual test coverage files associated with the respective modules and generates an aggregated test coverage report that the system stores in an overall test coverage file 322. The overall test coverage file 322 provides application-wide or overall test results for all of the modules combined.

Figure 4:
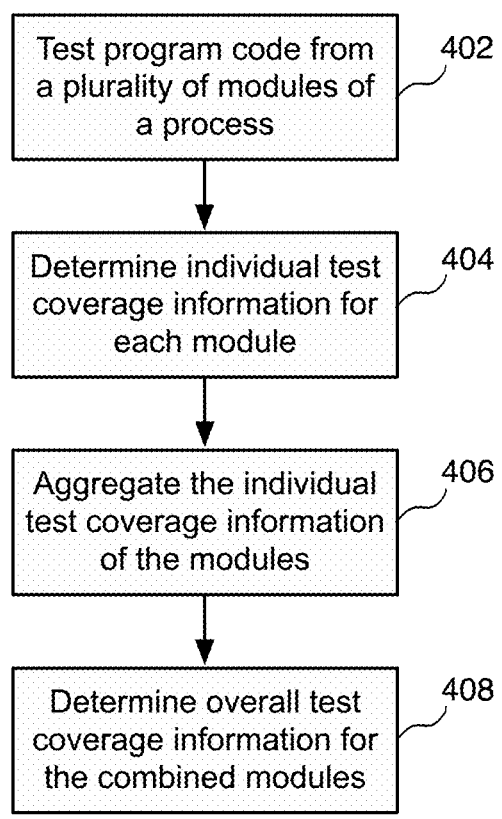
FIG. 4 illustrates an example flow diagram for enhancing test coverage of multi-module code, according to some implementations.

FIG. 4 illustrates an example flow diagram for enhancing test coverage of multi-module code, according to some implementations. In various implementations, a method is initiated at block 402, where a system such as a server tests program code from multiple software modules of a process such as a business process. In various implementations, the system may test the program code of a given module automatically when the program code of the module is processed in a predetermined step (e.g., compiling, etc.). In some implementations, the system may test modules upon receiving a command from a user, such as developer, to begin testing. Testing may be performed at developer system 12 of FIG. 1 and/or at any other suitable location such as model artifact constructor 16, planning model generation framework 14, or any combination of thereof. The steps described herein may also be implemented by software deployment system 210 of FIG. 2.

The steps described herein are further described in the context of FIG. 5 below, where a plugin of the system performs one or more tests on the program code of each module, for one or more modules of the process. As describe in more detail herein, the plugin improves multi-module test coverage.

Figure 5:
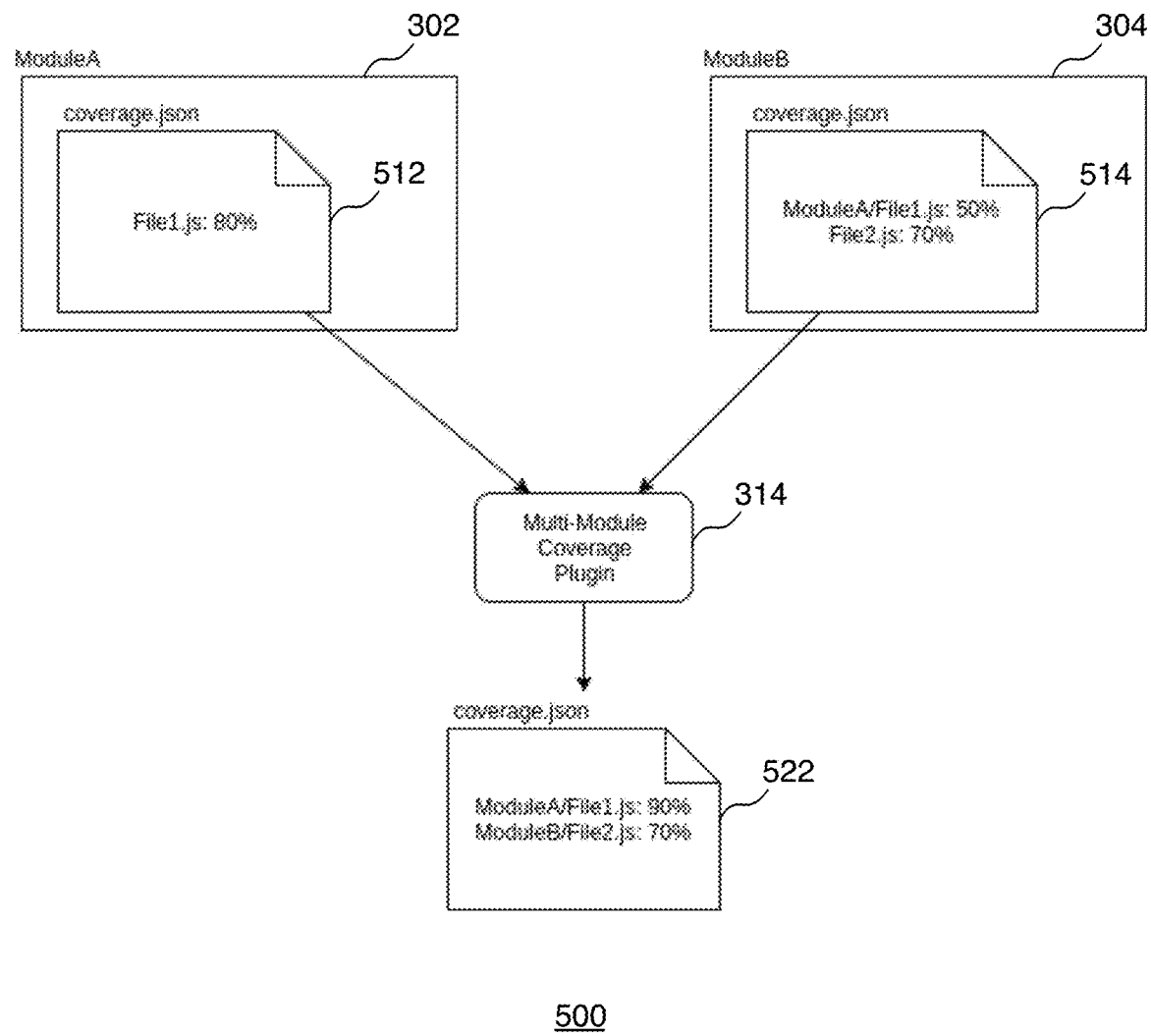
FIG. 5 illustrates an example block diagram of a multi-module environment, including a plugin for multi-module test coverage, according to some implementations.

FIG. 5 illustrates an example block diagram of a multi-module environment 500, including a plugin for multi-module test coverage, according to some implementations. As shown, multi-module environment 500 includes module 302 (labeled ModuleA), module 304 (labeled ModuleB), and plugin 314. The scenario of multi-module environment 500 of FIG. 5 is similar to multi-module environment 300 of FIG. 3.

For ease of illustration, the following example shows test processes for two modules (e.g., modules 302 and 304). These implementations and others also apply to scenarios where there are more than two modules. The particular number of modules will depend on the particular implementation. Multi-module environment 500 is further described in the context of the following steps.

At block 404, the system determines individual test coverage information for each module of the process based on the testing of the program code for each module. As described in more detail herein, in various implementations, the system may determine individual test coverage information for each program code file of each module based on the testing of lines of program code for each program code file.

In some implementations, the individual test coverage information includes individual test results for each module and an individual test coverage value for each module. For example, plugin 314 of the system initiates an individual test of the program code of modules 302 and 304. As described in more detail herein, in various implementations, the individual test coverage information includes individual test results for each program code file of each module and an individual test coverage value for each program code file of each module. The individual test coverage information is described in more detail herein.

In some implementations, the system stores the program code for each module in one or more program code files, where each portion of the program code for each module is stored in an associated program code file. In some implementations, each file containing a portion of program code is a JS file. For example, the system may store program code in JS files (e.g., File1.js and File2.js).

In some implementations, the individual test coverage value of each module is a percentage of the portions of program code of the particular module that was tested. For example, in some implementations, the individual test coverage value of each module is a percentage of the program code files containing portions of program code of the particular module that was tested. For example, referring to FIG. 5, module 302 has a JS file, referred to as File 1. For ease of illustration, one file of program code is described. In other implementations, module 302 may have numerous files of program code. For example, module 302 may have 50 or more files of program code, etc.

In some implementations, the individual test coverage value of each module is be a percentage of program code lines per file that was tested. In this particular example, there are 10 lines of program code in File1.js. The following are example (simplified) lines of program code for File1.js of module 302:
Code line 1
Code line 2
Code line 3
Code line 4
Code line 5
Code line 6
Code line 7
Code line 8
Code line 9
Code line 10

The actual lines of program code may be numerous (e.g., thousands of lines of code, etc.), depending on the particular implementation.

As shown, the system determines individual test coverage information for module 302 based on the testing of the program code of the program code file (File1.js) of module 302. In some implementations, the individual test coverage information in contained in an individual test coverage file 512 (labeled coverage.json). In various implementations, individual test coverage file 512 is a JSON file. Individual test coverage file 512 includes individual test coverage information. As indicated herein, the individual test coverage information includes individual test results for module 302 and an individual test coverage value for module 302.

In an example scenario, code lines 1 through 8 were tested, and code lines 9 and 10 were not tested, resulting in 80% test coverage. As such, the individual test coverage value is 80%.

Individual test coverage file 512 may include the following individual test coverage information:
File1.js: 80%.
where File1.js is the program code file containing the program code of module 302, and 80% is the individual test coverage value of the program code of module 302.

As shown in FIG. 5, module 304 has a JS file, referred to as File 2. For ease of illustration, one file of program code is described. In other implementations, module 304 may have numerous files of program code. For example, module 304 may have 50 or more files of program code, etc.

In this particular example, there are 10 lines of program code in File2. The following are example (simplified) lines of program code for File2.js of module 304:
Code line 11
Code line 12
Code line 13
Code line 14
Code line 15
Code line 16
Code line 17
Code line 18
Code line 19
Code line 20

As with File1.js of module 302, the actual lines of program code in File2.js of module 304 may be numerous (e.g., thousands of lines of code, etc.), depending on the particular implementation.

As shown, the system determines individual test coverage information for module 304 based on the testing of the program code of the program code file (File2.js) of module 304. In some implementations, the individual test coverage information is contained in an individual test coverage file 514 (labeled coverage.json). In various implementations, individual test coverage file 514 is a JSON file. Individual test coverage file 514 includes individual test coverage information. As indicated herein, the individual test coverage information includes individual test results for module 304 and an individual test coverage value for module 304.

In an example scenario, code lines 11 through 17 were tested, and code lines 18 through 20 were not tested, resulting in 70% test coverage. As such, the individual test coverage value is 70%.

In this particular implementation, module 304 has an external dependency at module 302. In other words, the program code in File2.js refers to a dependency in File1.js of module 302. As such, in various implementations, the system also tests the program code contained in File1.js of module 302.

In this example, the system tested code lines 5 through 9, but code lines 1 through 4 and code line 10 were not tested, resulting in 50% test coverage. As such, the individual test coverage value is 50%.

Individual test coverage file 514 may include the following individual test coverage information:
ModuleA/File1.js: 50%
File2.js: 70%
where ModuleA corresponds to module 302; File1.js is the program code file containing the program code of module 302; 50% is the individual test coverage value of the program code of module 302; File2.js is the program code of module 304; and 70% is the individual test coverage value of the program code of module 302.

The test coverage of a given module is a metric of the quality of the program code of the given module. In some implementations, program code would not be deployed (e.g., go into a product) until it is tested. Higher test coverage for each module is desirable, and program code is tested before being released.

In various implementations, the system compares the individual test coverage value of each module to a predetermined individual test coverage threshold. For example, the predetermined threshold may be a percentage (e.g., 80% 90%, 95%, etc.). The system then determines if the individual test coverage value meets the predetermined individual test coverage threshold. In some implementations, there may be a different predetermined individual test coverage threshold for different modules, depending on the particular implementation.

In various implementations, if the individual test coverage value for a given module falls below a predetermined individual test coverage threshold (e.g., individual test coverage value is 70% and the predetermined individual test coverage threshold is 80%), the system may send out a notice or alert in order to inform another system and/or person that additional testing is needed for the module. In some implementations, the system may indicate in the notice not only that additional testing is needed, but also which specific program code files, etc. need testing or retesting. The system may also indicate in the notice the test results for each program code file that was tested, etc. As such, untested program code files could then be tested. Also, program code that failed predetermined test criteria could be modified or fixed and retested.

In various implementations, if the individual test coverage value for a given module meets (equals or exceeds) a predetermined individual test coverage threshold (e.g., individual test coverage value is 80% and the predetermined individual test coverage threshold is 80%), the system may indicate in the individual test coverage information that the testing for that particular module passed, and may also indicate the individual test coverage value and the predetermined individual test coverage threshold. An indication of passing may occur during first-time testing, or after appropriate improvements.

In the example of FIG. 5, if the predetermined individual test coverage threshold is 80% for both modules 302 and 304, the program code of module 302 having an individual test coverage value is 80% would pass, and the program code of module 304 individual test coverage value is 50% would fail. The system would send out any notices or alerts accordingly. This predetermined individual test coverage threshold value is a simple example value, and the actual predetermined individual test coverage threshold may vary depending on the particular implementation. For example, the actual predetermined individual test coverage threshold may be higher (e.g., 95%, 99%, 99.5%, etc.).

As indicated herein, the system stores the individual test coverage information of particular module in an individual test coverage information file associated with that particular module (e.g., coverage.json of module 302, coverage.json of module 304, etc.).

At block 406, the system aggregates the individual test coverage information of the software modules. As indicated herein, in some implementations, the system stores the individual test coverage information of each module in an individual test coverage information file associated with each module. In some implementations, to aggregate the individual test coverage information, the system merges the individual test coverage information files into an overall test coverage information file. For example, the system may store the overall test coverage information in overall test coverage information file 522.

At block 408, the system determines overall test coverage information for the combined modules. In various implementations, the overall test coverage information is based on the aggregating of the individual test coverage information for the software modules.

Overall test coverage information file 522 may include the following overall test coverage information:

ModuleA/File1.js: 90%

ModuleB/File2.js: 70% where ModuleA corresponds to module 302, File1.js is the program code file containing the program code of module 302, 90% is the overall test coverage value of the program code of module 302, ModuleB corresponds to module 304, File2.js is the program code of module 304, and 70% is the overall test coverage value of the program code of module 304.

As shown, 70% of the lines of code of File2.js were tested in one instance of testing. As such, 70% is the overall test coverage value of the program code of module 304.

In the example scenarios, code lines 1 through 8 were tested, and code lines 9 and 10 were not tested with respect to module 302. The resulting test coverage was 80%, and the individual test coverage value is 80%. Code lines 5 through 9 were tested, but code lines 1 through 4 and code line 10 were not tested with respect to module 304. The resulting test coverage was 50% and the individual test coverage value is 50%. Because, overall, code lines 1 through 9 were tested, the resulting overall test coverage is 90%. As such, the overall test coverage value is 90%.

Note that the overall test coverage value for the program code of module 302 may vary depending on which particular lines of program code were tested in association with either module 302 or module 304. For example, with respect to the testing of module 304, if code lines 9 and 10 were not tested, the overall test coverage would still be 80%, and the overall test coverage value would be 80%. In another scenario, with respect to the testing of module 304, if code lines 9 and 10 were tested, the overall test coverage would be 100%, and the overall test coverage value would be 100%.

In various implementations, overall test coverage information file 522 may include which portions of code and/or what JS files of program code of which modules were tested. Overall test coverage information file 522 also includes the test results. In various implementations, overall test coverage information file 522 also includes a overall test coverage value for the combined modules, as well as the individual coverage value for each of the individual modules.

For example, as shown, module 302 has dependencies with module 304 and module 306. For example, program code in module 302 refers to one or more of JS files 308 and 310. If module 302 is tested with a 100% test coverage, but module 304 is tested with a 90% test coverage, there would be a 10% coverage gap associated with module 304. The test coverage of module 302 would not detect any gaps in coverage of the module 304. For example, if code associated with JS file 308 was not tested, the testing of module 302 would not catch that coverage gap in module 304. In various implementations described herein, the overall test coverage information for the entire set of modules would, however, detect coverage gaps that may occur in different modules.

As indicated herein, the overall test coverage information includes an overall test coverage value for the software modules combined. In various implementations, the system compares the overall test coverage value to a predetermined overall test coverage threshold. For example, the predetermined overall test coverage threshold may be a percentage (e.g., 80%, 90%, 95%, etc.). The system then determines if the overall test coverage value meets the predetermined overall test coverage threshold. The test coverage of a given module and the combined test coverage of all the modules are metrics of the quality of the code. In some implementations, code would not be deployed (e.g., go into a product) until it is tested. As such, implementations provide an application-wide metric of quality.

In various implementations, the system generates plugin 314. Plugin 314 merges coverage results from all modules into integrated application-wide coverage results. Plugin 314 generates an aggregated test coverage report 322, which provides test coverage results for all of the modules combined. In some implementations, plugin 314 also provides individual test coverage reports for each of the modules. Implementations provide improved efficiency, and comprehensive, accurate reporting of tests.

Figure 6:
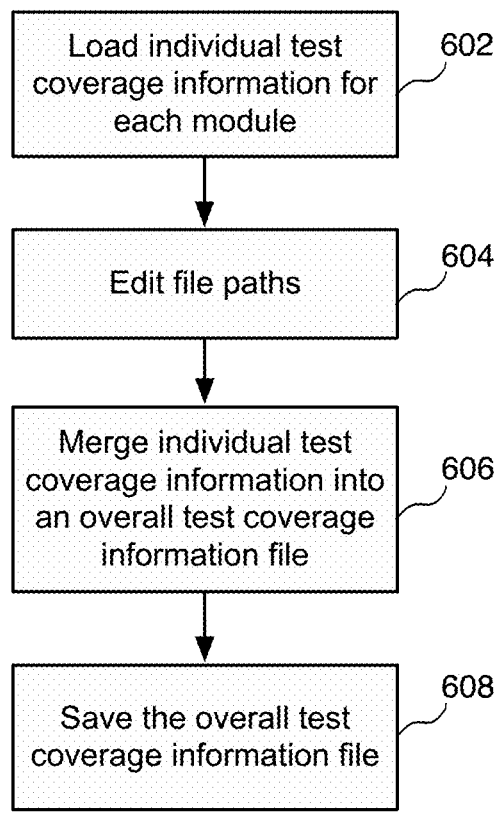
FIG. 6 illustrates an example flow diagram for aggregating test coverage information, according to some implementations.

FIG. 6 illustrates an example flow diagram for aggregating test coverage information, according to some implementations. In various implementations, a method is initiated at block 602, where plugin 314 loads the individual test coverage information from each module. For example, plugin 314 may load the individual test coverage information from the individual test coverage information files (e.g., coverage.json files) corresponding to modules 302 and 304.

At block 604, plugin 314 edits the file paths such that the file paths to the same individual test coverage information file are the same. For example, when the individual test coverage information file is generated for module 302 (Module A), the file path may be saved as "src/js/file1.js". When the individual test coverage information file is generated for module 304 (module B), where the test coverage information of module 304 includes individual test coverage information from module 302, the file path to module 302 may be saved as "bower_components/moduleA/src/js/file1.js". As such, plugin 314 may edit the file paths in the individual test coverage information such that the file paths to module 302 are the same (e.g., "moduleA/src/js/file1.js") for both☐modules).

At block 606, plugin 314 merges all of the individual test coverage information from the different modules into an overall test coverage information file. In various implementations, plugin 314 may use any suitable utility to merge all of the individual test coverage reports into one overall test coverage file.

At block 608, plugin 314 saves the resulting overall test coverage information file.

In various implementations, if the overall test coverage value falls below a predetermined overall test coverage threshold (e.g., overall test coverage value is 70% and the predetermined overall test coverage threshold is 90%), the system may send out a notice or alert in order to inform another system and/or person that additional testing is needed for one or more modules. In some implementations, the system may indicate in the notice not only that additional testing is needed but also which specific program code files, etc. need testing or retesting. The system may also indicate in the notice the test results for each program code file that was tested, etc. As such, untested program code files could then be tested. Also, program code that failed predetermined test criteria could be modified or fixed and retested.

In various implementations, if the overall test coverage value for the combined modules meets (equals or exceeds) the predetermined overall test coverage threshold (e.g., overall test coverage value is 90% and the predetermined overall test coverage threshold is 90%), the system may indicate in the overall test coverage information that the testing for the modules combined passed and may also indicate the overall test coverage value and the predetermined overall test coverage threshold. An indication of passing may occur during first-time testing, or after appropriate improvements.

As indicated herein, different test coverage thresholds may be applied to different modules for the same program code files. For example, an individual test coverage threshold of 80% may be applied to File1.js with respect to testing at module 302, an individual test coverage threshold of 50% may be applied to File1.js with respect to testing at module 304, and an overall test coverage threshold of 95% may be applied to File1.js with respect to the overall test coverage. As a result, the program code with respect to the testing at module 302 may pass, the program code with respect to the testing at module 304 may pass, and the program code with respect to the overall test coverage may fail. The system would send out appropriate notices and/or alerts, accordingly.

The process may then be deployed by packaging delivery, deployment and runtime system 20 as a cloud-deployed package 54, which is then made available to customer administrator system 22 and customer end-user system 24, as shown in FIG. 1.

In various implementations, the steps described herein may be implemented by developer system 12 of FIG. 1. The steps described herein may also be implemented by software deployment system 210 of FIG. 2.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 7:
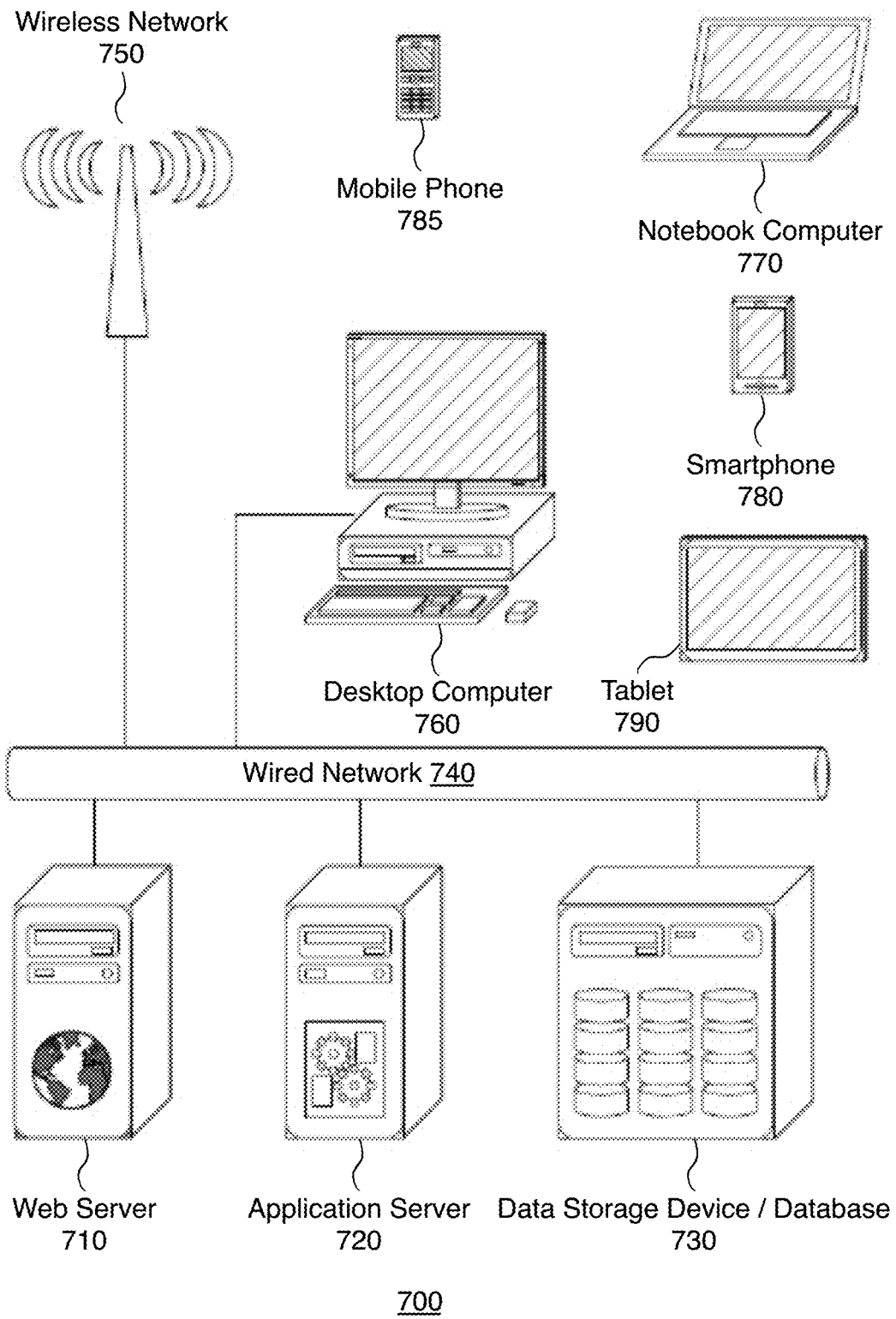
FIG. 7 illustrates an example block diagram of a system, which may be used for implementations described herein.

FIG. 7 illustrates an example block diagram of a system 700, which may be used for implementations described herein. Example system 700 is capable of supporting or running various hardware and/or software modules and associated methods discussed with reference to FIGS. 1-6. Note that certain implementations may be implemented using one or more standalone applications (for example, residing in a user device) and/or one or more web-based applications implemented using a combination of client-side and server-side code. While system 700 performs implementations described herein, in other implementations, any suitable component or combination of components associated with system 700 or any suitable processor or processors associated with system 700 may facilitate performing the implementations described herein. In various implementations, system 700 may not have all of the components shown and/or may have other elements including other types of components instead of, or in addition to, those shown herein.

General system 700 includes user devices 760-790, including one or more desktop computers 760, one or more notebook computers 770, one or more smartphones 780, one or more mobile phones 785, and one or more tablets 790. General system 700 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although system 700 is shown with five user devices, any number of user devices can be supported.

A web server 710 is used to process requests from web browsers and standalone applications for web pages, electronic documents, enterprise data or other content, and other data from the user computers. Web server 710 may also provide push data or syndicated content, such as RSS feeds, of data related to enterprise operations.

An application server 720 operates one or more applications. The applications can be implemented as one or more scripts or programs written in any programming language, such as JAVA®, C, C++, C#, or any scripting language, such as JAVASCRIPT™ or European computer manufacturers association script (ECMAScript), PERL™, hypertext preprocessor (PHP), PYTHON®, RUBY™, or tool command language (TCL). Applications can be built using libraries or application frameworks, such as RUBY on Rails™, Enterprise JAVABEANS™, or .NET. Web content may be created using hypertext markup language (HTML), cascading style sheets (CSS), and other web technology, including templating languages and parsers.

The data applications running on application server 720 are adapted to process input data and user computer requests and can store or retrieve data from data storage device or database 730. Database 730 stores data created and used by the data applications. In some implementations, database 730 includes a relational database that is adapted to store, update, and retrieve data in response to SQL format commands or other database query languages. Other implementations may use unstructured data storage architectures and Not Only SQL (NoSQL) databases.

In some implementations, application server 720 includes one or more general-purpose computers capable of executing programs or scripts. In some implementations, web server 710 is implemented as an application running on the one or more general-purpose computers. Web server 710 and application server 720 may be combined and executed on the same computers.

An electronic communication network 740-750 enables communication between user computers 760-790, web server 710, application server 720, and database 730. In some implementations, networks 740-750 may further include any form of electrical or optical communication devices, including wired network 740 and wireless network 750. Networks 740-750 may also incorporate one or more local-area networks, such as an Ethernet network, wide-area networks, such as the Internet; cellular carrier data networks; and virtual networks, such as a virtual private network.

System 700 is one example for executing applications according to some implementations. In some implementations, application server 710, web server 720, and optionally database 730 can be combined into a single server computer application and system. In further implementations, virtualization and virtual machine applications may be used to implement one or more of application server 710, web server 720, and database 730.

In still further implementations, all or a portion of the web and application serving functions may be integrated into an application running on each of the user computers. For example, a JAVASCRIPT™ application on the user computer may be used to retrieve or analyze data and display portions of the applications.

In various implementations, system 700 may not have all of the components shown and/or may have other elements including other types of components instead of, or in addition to, those shown herein.

With reference to FIGS. 1 and 7, developer system(s) 12, customer administrator system(s) 22, and customer end-user system(s) 24 of FIG. 1 may be implemented in whole or in part via one or more of desktop computer 760, notebook computer 770, smartphone 780, mobile phone 785, and tablet 790 of FIG. 7 and/or other computing devices such as computing system 200 of FIG. 2. In some implementations, computing devices 760-790 run browsers, e.g., used to display developer UI(s) 26 and UIs of customer administrator system(s) 22 and customer end-user system(s) 24 of FIG. 1.

In some implementations, browsers of systems 12, 22, 24 of FIG. 1 connect to the Internet, represented by wired network 740 and/or wireless network 750 as shown in FIG. 7, to access one or more network-coupled servers, databases, and/or associated cloud-based functionality, as represented by modules 14-20 of FIG. 1. Note that one or more of web server 710, application server 720, and data storage device or database 730 shown in FIG. 7 may be used to host software corresponding to modules 14-20 of FIG. 1, as detailed more fully below.

In some implementations, model artifact constructor 16, planning model generation framework 14 (including accompanying flex dimension framework 36, feature-artifact mapping module 38, runtime model generator 40, dynamic integrator 42, and UI generator 44), dynamic business planning module 18 and accompanying model adaptation module 46 (including model specifications 48, question generator 50, and answer incorporator 52), and packaging, delivery, deployment, and runtime system 20 (and accompanying cloud-deployed package 54) of FIG. 1 run in a cloud computing environment that includes a collection of plural web servers 710, application servers 720, and data storage devices 730 shown in FIG. 7.

For example, in some implementations, planning model generation framework 14 and model artifact constructor 16 of FIG. 1 run on a process cloud that communicates with a document cloud via an integration mechanism, e.g., middleware, APIs, web services, etc. The document cloud maintains data storage devices 730 of FIG. 7 to maintain data that is generated by customers, e.g., via customer end-user systems 24 of FIG. 1 through use of cloud-deployed package 54. The process cloud in combination with the document cloud act as an overall cloud that supports development, deployment, dynamic adaptation, and use of dynamic software applications and accompanying models (e.g., dynamic business planning model 18 of FIG. 1) shown in FIG. 1.

In general, software developers e.g., users of developer systems 12 of FIG. 1, may subscribe to certain cloud services to facilitate development of software applications and storage of associated files. A cloud service that is configured for software application or process flow development is called a process cloud service (PCS).

A process cloud service may employ a networked database, e.g., data storage device 730 of FIG. 7 or database 220 of FIG. 2, to store files and other objects used by a given software program being developed. Server-side development environments may be accessible to developers via browsers. The development environments may be backed by the PCS, such that developed software application files are stored in the PCS database corresponding to the one or more of data storage devices 730 of FIG. 7 or database 220 of FIG. 2.

A document cloud may include document management functionality in communication with folder structures, and documents and may incorporate functionality for adding rich metadata documents and folders. The document management functionality may include metadata services (MDS) for characterizing folders and documents and associated structures with various types of metadata. The document management functionality may further include software (which may include a combination of webpage code from web server 710 of FIG. 7 and supporting application code of application server 720 of FIG. 7, where the webpage code may call the application code using web services, APIs, etc.) for generating one or more customer UI display screens, e.g., UI display screens presented via browsers of customer administrator systems 22 and customer end-user systems 24 of FIG. 1.

In some implementations, the UI display screens include accompanying UI controls and associated options. Example options include options to browse, create, delete, define, upload, download, etc., folders, structures, and documents, etc., as maintained via the folder structures and documents.

In some implementations, browsers used by developer system 12, customer administrator system 22, and customer end-user system 24 of FIG. 1, interface with web servers 710 shown in FIG. 7 to access websites and accompanying webpage code, which is backed by applications used to implement modules 16-20 of FIG. 1. The webpage code of web servers 710 of FIG. 7 uses web services, APIs, and/or other interfacing mechanisms to communicate with application software hosted on application servers 720 of FIG. 7 of the cloud, which includes a collection of web servers 710, application servers 720, and data storage devices 730 of FIG. 7.

Various implementations discussed herein may provide substantial benefits in terms of providing efficiencies in systems and methods that achieve a new and useful end as they pertain to new software adaptability. In particular, certain implementations discussed herein uniquely leverage input from customers, the input of which may change over time as user needs change, to enable substantial hereto-fornot possible or practical dynamic software model reconfiguration and/or reconstruction.

Certain implementations may provide virtually automatic incorporation of such inputs into a seamlessly adaptable software package that is responsive to the changing user needs and automatically seamlessly handles software integrations.

Accordingly, various implementations provide new capabilities for efficient software adaptation, in part by uniquely leveraging associations between user-provided answers to questions, sets of software model artifacts, sets of software functionality, and mappings or relationships.

Figure 8:
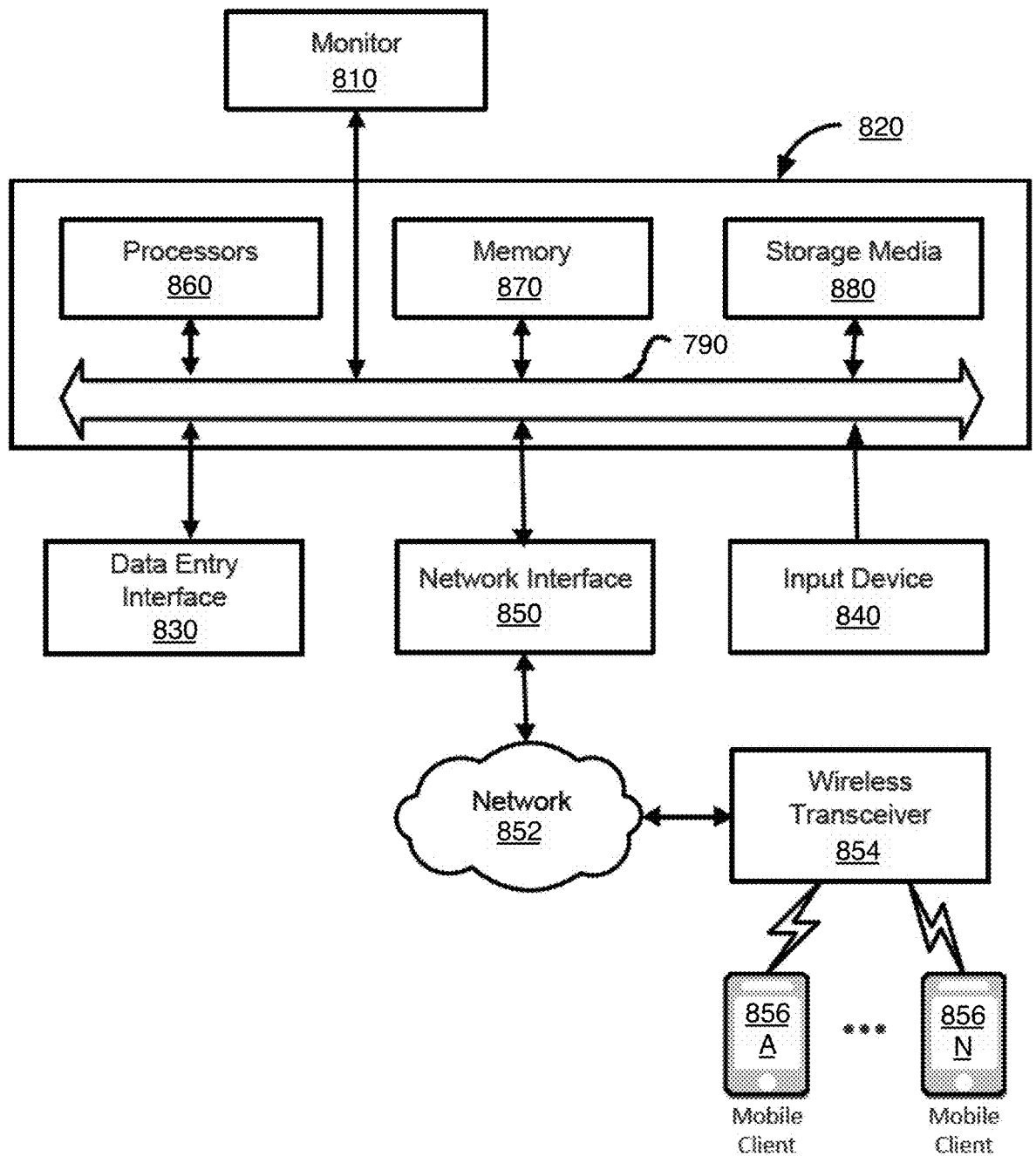
FIG. 8 illustrates an example block diagram of a network environment, which may be used for implementations described herein.

FIG. 8 illustrates an example block diagram of a network environment 800, which may be used for implementations described herein. Network environment 800 is merely illustrative and not intended to limit the scope of the claims. One of ordinary skill in the art would recognize other variations, modifications, and alternatives. For example, network environment 800 may be implemented in a distributed clientserver configuration having one or more client devices in communication with one or more server systems.

In one exemplary implementation, network environment 800 includes a display device such as a monitor 810, a computer 820, a data entry interface 830 such as a keyboard, touch device, and the like, an input device 840, a network interface 850, and the like. Input device 840 is typically implemented as a computer mouse, a trackball, a track pad, wireless remote, tablet, touch screen, and the like. Moreover, input device 840 typically allows a user to select and operate objects, icons, text, characters, and the like that appear, for example, on the monitor 810.

Network interface 850 may include an Ethernet card, a modem (telephone, satellite, cable, integrated services digital network (ISDN), etc.), an (asynchronous) digital subscriber line (DSL) unit, and the like. Furthermore, network interface 850 may be physically integrated on the motherboard of computer 820, may be a software program, such as soft DSL, or the like.

Network environment 800 may also include software that enables communications over communication network 852 such as the hypertext transfer protocol (HTTP), transmission control protocol/Internet protocol (TCP/IP), real-time transport protocol/real-time streaming protocol (RTP/RTSP), protocols, wireless application protocol (WAP), Institute of Electrical and Electronics Engineers (IEEE) 802.11 protocols, and the like. In addition to and/or alternatively, other communications software and transfer protocols may also be used, for example Internetwork packet exchange (IPX), user datagram protocol (UDP) or the like.

Communication network 852 may include a local area network, a wide area network, a wireless network, an Intranet, the Internet, a private network, a public network, a switched network, or any other suitable communication network, such as for example cloud networks. Communication network 852 may include many interconnected computer systems and any suitable communication links such as hardwire links, optical links, satellite or other wireless communications links such as Bluetooth, WIFI, wave propagation links, or any other suitable mechanisms for communication of information. For example, communication network 852 may communicate to one or more mobile wireless devices 856A-N, such as mobile phones, tablets, and the like, via a base station such as wireless transceiver 854.

Computer 820 may include familiar computer components such as one or more processors 860, and memory storage devices, such as a memory 870, e.g., random access memory (RAM), storage media 880, and system bus 890 interconnecting the above components. In one embodiment, computer 820 is a PC compatible computer having multiple microprocessors, graphics processing units (GPU), and the like. While a computer is shown, it will be readily apparent to one of ordinary skill in the art that many other hardware and software configurations are suitable for use with implementations described herein. While computer 820 performs implementations described herein, in other implementations, any suitable component or combination of components associated with computer 820 or any suitable processor or processors associated with computer 820 may facilitate performing the implementations described herein. In various implementations, computer 800 may not have all of the components shown and/or may have other elements including other types of components instead of, or in addition to, those shown herein.

Memory 870 and Storage media 880 are examples of non-transitory tangible media for storage of data, audio/video files, computer programs, and the like. Other types of tangible media include disk drives, solid-state drives, floppy disks, optical storage media such as compact disc-read only memory (CD-ROMS) and bar codes, semiconductor memories such as flash drives, flash memories, read-only-memories (ROMS), battery-backed volatile memories, networked storage devices, cloud storage, and the like.

Although the description has been described with respect to particular embodiments thereof, these particular embodiments are merely illustrative, and not restrictive. For example, while various implementations discussed herein address development, deployment, and use of dynamic business planning models used to implement cloud-based enterprise software applications and associated services, implementations are not limited thereto.

Various implementations need not be deployed via an Internet cloud, but instead may be hosted on an internal enterprise server on a local network. Furthermore various implementations may be implemented as desktop software, such that the incremental updating happens on the end-user computer on which the software leveraging the dynamic planning model runs. In addition, implementations are not limited to use in conventional business applications and computing environments, and may be used, for example, by governments, universities, and other organizations to facilitate various types of planning activities. In addition, implementations need not be limited to planning software, but may be used to dynamically update different types of software that may benefit by the ability to dynamically adapt to specific needs and/or changing needs of an organization and/or associated computing environment.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a non-transitory computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A non-transitory computer-readable storage medium carrying program instructions thereon, the instructions when executed by one or more processors cause the one or more processors to perform operations comprising:

testing, at a server, program code from a plurality of software modules of a process, wherein at least one software module in the plurality of software modules has dependencies on one or more other software modules of the plurality of software modules, wherein the software modules include one or more files;

determining individual test coverage information for each software module of the process based on the testing of the program code for each software module, wherein the individual test coverage information includes individual test results for each software module and an individual test coverage value for each software module;

storing the individual test coverage information of lines of code executed for each software module in respective individual test coverage files;

using a multi-module coverage plugin to aggregate the individual test coverage information of the software modules stored in the individual test coverage files;

using the plugin to modify file paths to reflect individual test coverage files associated with a first module and a second module of the modules, wherein the first module includes a first file and the second module includes a second file that refers to the first file, wherein a file path to the first file is modified to indicate the first module includes the first file, wherein the one or more files include the first file and the second file;

using the plugin to analyze the individual test coverage information of the at least one software module without regard to testing coverage gaps introduced by the dependencies on one or more other software modules;

using the plugin to determine overall test coverage information for the software modules, wherein the overall test coverage information is based on the aggregate lines of code executed as indicated by the individual test coverage information for the software modules stored in the individual test coverage files, wherein the first module executes a first line of the first file, and the second file of the second module executes a second line of the first file, and the overall test coverage information indicates the first line and the second line of the first file were executed;

using the plugin to detect the testing coverage gaps in the individual test coverage information with respect to code referred to by at least two of the plurality of software modules by analyzing the overall test coverage information relative to the individual test coverage information, wherein the testing coverage gaps indicates a third module executes more lines of a third file than a fourth module executes of the third file resulting in a gap of coverage with respect to the third file, and wherein the overall test coverage information includes file paths for the one or more files indicating which of the modules include respective files of the one or more files; and using the plugin to merge the individual test coverage files into an overall test coverage information file.

2. The computer-readable storage medium of claim 1, wherein the instructions when executed further cause the one or more processors to perform operations comprising storing the program code for each software module in one or more program code files, and wherein each portion of the program code for each software module is stored in an associated program code file.

3. The computer-readable storage medium of claim 1, wherein the individual test coverage value for each software module is a percentage of portions of program code that was tested.

4. The computer-readable storage medium of claim 1, wherein the individual test coverage value of each software module is a percentage of program code lines that were tested.

5. The computer-readable storage medium of claim 1, wherein the instructions when executed further cause the one or more processors to perform operations comprising:
- comparing the individual test coverage value to an individual test coverage threshold; and
- determining if the individual test coverage value meets the individual test coverage threshold.

6. The computer-readable storage medium of claim 1, wherein the overall test coverage information includes an overall test coverage value for the software modules, wherein the instructions when executed further cause the one or more processors to perform operations comprising:
- comparing the overall test coverage value to an overall test coverage threshold; and
- determining if the overall test coverage value meets the overall test coverage threshold.

7. A method for enhancing test coverage of multi-module code, the method comprising:
- testing, at a server, program code from a plurality of software modules of a process, wherein at least one software module in the plurality of software modules has dependencies on one or more other software modules of the plurality of software modules, wherein the software modules include one or more files;
- determining individual test coverage information for each software module of the process based on the testing of the program code for each software module, wherein the individual test coverage information includes individual test results for each software module and an individual test coverage value for each software module;
- storing the individual test coverage information of lines of code executed for each software module in respective individual test coverage files;
- using a multi-module coverage plugin to aggregate the individual test coverage information of the software modules stored in the individual test coverage files;
- using the plugin to modify file paths to reflect individual test coverage files associated with a first module and a second module of the modules, wherein the first module includes a first file and the second module includes a second file that refers to the first file, wherein a file path to the first file is modified to indicate the first module includes the first file, wherein the one or more files include the first file and the second file;
- using the plugin to analyze the individual test coverage information of the at least one software module without regard to testing coverage gaps introduced by the dependencies on one or more other software modules;
- using the plugin to determine overall test coverage information for the software modules, wherein the overall test coverage information is based on the aggregate lines of code executed as indicated by the individual test coverage information for the software modules stored in the individual test coverage files, wherein the first module executes a first line of the first file, and the second file of the second module executes a second line of the first file, and the overall test coverage information indicates the first line and the second line of the first file were executed;
- using the plugin to detect the testing coverage gaps in the individual test coverage information with respect to code referred to by at least two of the plurality of software modules by analyzing the overall test coverage information relative to the individual test coverage information, wherein the testing coverage gaps indicates a third module executes more lines of a third file than a fourth module executes of the third file resulting in a gap of coverage with respect to the third file, and wherein the overall test coverage information includes file paths for the one or more files indicating which of the modules include respective files of the one or more files; and
- using the plugin to merge the individual test coverage files into an overall test coverage information file.

8. The method of claim 7, further comprising storing the program code for each software module in one or more program code files, and wherein each portion of the program code for each software module is stored in an associated program code file.

9. The method of claim 7, wherein the individual test coverage value for each software module is a percentage of portions of program code that was tested.

10. The method of claim 7, wherein the individual test coverage value of each software module is a percentage of program code lines that were tested.

11. The method of claim 7, further comprising:
- comparing the individual test coverage value to an individual test coverage threshold; and
- determining if the individual test coverage value meets the individual test coverage threshold.

12. The method of claim 7, wherein the overall test coverage information includes an overall test coverage value for the software modules, wherein the instructions when executed further cause the one or more processors to perform operations comprising:
- comparing the overall test coverage value to an overall test coverage threshold; and
- determining if the overall test coverage value meets the overall test coverage threshold.

13. An apparatus comprising:
- one or more processors; and
- logic encoded in one or more non-transitory computer-readable storage media for execution by the one or more processors and when executed operable to perform operations comprising:
  - testing, at a server, program code from a plurality of software modules of a process, wherein at least one software module in the plurality of software modules has dependencies on one or more other software modules of the plurality of software modules, wherein the software modules include one or more files;
  - determining individual test coverage information for each software module of the process based on the testing of the program code for each software module, wherein the individual test coverage information includes individual test results for each software module and an individual test coverage value for each software module;

storing the individual test coverage information of lines of code executed for each software module in respective individual test coverage files;

using a multi-module coverage plugin to aggregate the individual test coverage information of the software modules stored in the individual test coverage files;

using the plugin to modify file paths to reflect individual test coverage files associated with a first module and a second module of the modules, wherein the first module includes a first file and the second module includes a second file that refers to the first file, wherein a file path to the first file is modified to indicate the first module includes the first file, wherein the one or more files include the first file and the second file;

using the plugin to analyze the individual test coverage information of the at least one software module without regard to testing coverage gaps introduced by the dependencies on one or more other software modules;

using the plugin to determine overall test coverage information for the software modules, wherein the overall test coverage information is based on the aggregate lines of code executed as indicated by the individual test coverage information for the software modules stored in the individual test coverage files, wherein the first module executes a first line of the first file, and the second file of the second module executes a second line of the first file, and the overall test coverage information indicates the first line and the second line of the first file were executed;

using the plugin to detect the testing coverage gaps in the individual test coverage information with respect to code referred to by at least two of the plurality of software modules by analyzing the overall test coverage information relative to the individual test coverage information, wherein the testing coverage gaps indicates a third module executes more lines of a third file than a fourth module executes of the third file resulting in a gap of coverage with respect to the third file, and wherein the overall test coverage information includes file paths for the one or more files indicating which of the modules include respective files of the one or more files; and using the plugin to merge the individual test coverage files into an overall test coverage information file.

14. The apparatus of claim 13, wherein the logic when executed is further operable to perform operations comprising storing the program code for each software module in one or more program code files, and wherein each portion of the program code for each software module is stored in an associated program code file.

15. The apparatus of claim 13, wherein the individual test coverage value for each software module is a percentage of portions of program code that was tested.

16. The apparatus of claim 13, wherein the individual test coverage value of each software module is a percentage of program code lines that were tested.

17. The apparatus of claim 13, wherein the logic when executed is further operable to perform operations comprising:
  comparing the individual test coverage value to an individual test coverage threshold; and
  determining if the individual test coverage value meets the individual test coverage threshold.

* * * * *

UNITED STATES PATENT AND TRADEMARK OFFICE
CERTIFICATE OF CORRECTION

| | | |
|---|---|---|
| PATENT NO. | : 11,294,799 B2 | |
| APPLICATION NO. | : 15/440916 | |
| DATED | : April 5, 2022 | |
| INVENTOR(S) | : Alabes et al. | |

It is certified that error appears in the above-identified patent and that said Letters Patent is hereby corrected as shown below:

On the Title Page

In Column 1, item (60) under Related U.S. Application Data, Line 3, below "16, 2016.", insert -- Provisional application No. 62/395,341, filed on Sep. 15, 2016 --, therefor.

In the Specification

In Column 5, Line 28, delete "(s)," and insert -- (s)), --, therefor.

In Column 5, Line 29, delete "System(s)." and insert -- System(s)). --, therefor.

In Column 6, Line 38, delete "Opts," and insert -- Opts,) --, therefor.

In Column 6, Line 52, delete "System(s)," and insert -- System(s)), --, therefor.

In Column 15, Line 36, delete "File 1." and insert -- File1. --, therefor.

In Column 15, Line 42, after "is" delete "be".

In Column 16, Line 15, delete "File 2." and insert -- File2. --, therefor.

In Column 19, Line 45, delete "modules)," and insert -- modules. --, therefor.

Signed and Sealed this
Twenty-third Day of August, 2022

Katherine Kelly Vidal
*Director of the United States Patent and Trademark Office*